(12) United States Patent
Sato et al.

(10) Patent No.: US 8,817,211 B2
(45) Date of Patent: Aug. 26, 2014

(54) LIQUID CRYSTAL DISPLAY DEVICE

(75) Inventors: Takeshi Sato, Kokubunji (JP); Hirotaka Imayama, Mobara (JP)

(73) Assignees: Panasonic Liquid Crystal Display Co., Ltd., Hyogo (JP); Japan Display, Inc., Tokyo (JP)

(*) Notice: Subject to any disclaimer, the term of this patent is extended or adjusted under 35 U.S.C. 154(b) by 27 days.

(21) Appl. No.: 13/217,312

(22) Filed: Aug. 25, 2011

(65) Prior Publication Data

US 2012/0050630 A1    Mar. 1, 2012

(30) Foreign Application Priority Data

Aug. 31, 2010  (JP) ................. 2010-193679

(51) Int. Cl.
*G02F 1/1337*    (2006.01)
(52) U.S. Cl.
USPC ................. 349/129; 349/143; 349/145
(58) Field of Classification Search
USPC ................. 349/143, 145, 129
See application file for complete search history.

(56) References Cited

U.S. PATENT DOCUMENTS 7,486,351 B2 * 2/2009 Itou et al. .......... 349/99
7,724,334 B2   5/2010 Ohta et al.
2003/0137615 A1  7/2003 Nakayoshi et al.
2009/0009671 A1  1/2009 Wakabayashi
2009/0128726 A1 * 5/2009 Tanno ................. 349/43

FOREIGN PATENT DOCUMENTS

| JP | 2003-215636 | 7/2003 |
| JP | 2007-199745 | 8/2007 |
| JP | 2008-276172 | 11/2008 |
| JP | 2009-181092 | 8/2009 |

* cited by examiner

*Primary Examiner* — Bumsuk Won
*Assistant Examiner* — Kendrick Hsu
(74) *Attorney, Agent, or Firm* — Antonelli, Terry, Stout & Kraus, LLP.

(57) ABSTRACT

Gate lines are arranged in a first direction. Drain lines are arranged in a second direction. A first electrode has slits formed therein. Aperture regions surrounded by the drain lines and the gate lines include an aperture region including the slits having a first inclined angle and an aperture region including the slits having a second inclined angle, the second inclined angle being different from the first inclined angle. The aperture region including the slits having the first inclined angle and the aperture region including the slits having the second inclined angle are alternately formed in the first direction. Within the aperture regions arranged adjacent to each other in the first direction, a first region and a second region forming a pair by being arranged so as to be opposed to each other via one of the gate lines form one of pixels.

11 Claims, 6 Drawing Sheets

PRIOR ART

LIQUID CRYSTAL DISPLAY DEVICE

CROSS-REFERENCE TO RELATED APPLICATION

The present application claims priority from Japanese application JP 2010-193679 filed on Aug. 31, 2010, the content of which is hereby incorporated by reference into this application.

BACKGROUND OF THE INVENTION

1. Field of the Invention

The present invention relates to a multi-domain liquid crystal display device.

2. Description of the Related Art

In a lateral electric field liquid crystal display device, as illustrated in FIG. 8, regions surrounded by drain lines DL and gate lines GL correspond to regions of pixels PXL, and a pixel electrode PX is formed in each of the pixels PXL. In the lateral electric field liquid crystal display device having such a structure, a common electrode is formed in an upper layer of the pixel electrodes PX through intermediation of an insulating film. In a region in which the common electrode overlaps the pixel electrode PX, slits SLT are formed, which are opened in a Y-direction indicated by arrows Y1 and Y2. The linear common electrodes are arranged so as to overlap the flat-plate like pixel electrode PX through intermediation of the insulating film. Here, in a case of a multi-domain liquid crystal display device, in each pixel PXL region, the slits SLT on the Y1-side and the slits SLT on the Y2-side have different inclined angles with respect to the Y-direction. With this structure, as indicated by arrows R1 and R2 of FIG. 8, it is possible to rotate liquid crystal molecules on the Y1-side of the pixel PXL and liquid crystal molecules on the Y2-side thereof in different rotational directions. In this manner, it is possible to improve viewing angle characteristics of the liquid crystal display device.

However, in such a multi-domain liquid crystal display device, it is known that disturbance of an electric field occurs at a boundary region BA at which the inclined angle of the slit SLT changes within the same pixel PXL region, which disturbs normal image display. Therefore, a method of suppressing such disturbance has been desired. As a liquid crystal display device capable of suppressing such disturbance of image display at the boundary region BA, there is a fringe field switching (FFS) liquid crystal display device described in Japanese Patent Application Laid-open No. 2009-181092. In the technology described in Japanese Patent Application Laid-open No. 2009-181092, the FFS liquid crystal display device has a structure in which connection portions of slits formed in upper electrodes (pixel electrodes), the slits being inclined in a plurality of different directions, overlap an opening portion of a lower electrode (common electrode).

Further, as a structure capable of realizing the multi-domain structure in a lateral electric field liquid crystal display device of an in-plane switching (IPS) type, there are technologies described in Japanese Patent Application Laid-open Nos. 2003-215636 and 2007-199745. In the technology described in Japanese Patent Application Laid-open No. 2003-215636, a liquid crystal display device with delta layout has a structure in which pixels curved in directions opposite to each other are arranged. Further, in the technology described in Japanese Patent Application Laid-open No. 2007-199745, a pixel having sides with angles opposite to each other is provided, to thereby improve uniformity of color tone.

In addition, as a structure capable of realizing the multi-domain structure in the FFS liquid crystal display device, there is a technology described in Japanese Patent Application Laid-open No. 2008-276172. In the technology described in Japanese Patent Application Laid-open No. 2008-276172, there are provided continuous portions corresponding to linear slits of a common electrode formed across adjacent pixels, and the slits have inclined angles which are in symmetry with respect to a boundary of unit pixels for color display of red (R), green (G), and blue (B). With this structure, it is possible to reduce viewing angle dependency.

In recent years, as for the liquid crystal display device to be mounted onto a mobile terminal device such as a mobile phone, although the size of a casing is limited, there have been demands for high definition and high image quality. In order to obtain high definition, it is necessary to form a large number of pixels within a limited display region, and hence an area occupied by one pixel is reduced. However, in order to form a thin film transistor for driving a pixel, a storage capacitor, and the like, a predetermined area is necessary, and hence an aperture ratio, which corresponds to an area of a region which transmits backlight with respect to an area occupied by the pixel, is decreased. Therefore, improvement in aperture ratio has been desired.

On the other hand, in order to improve display quality and achieve high image quality, it is necessary to improve brightness of the display image, and hence, similarly to the case of high definition, improvement in aperture ratio has been desired. In order to improve display brightness, it is conceivable to employ a method of increasing a light intensity of the backlight, but as for the mobile terminal device, there is also a demand for long battery life. Further, as for an image display device, there is a demand for reduction in power consumption of a backlight device, which has relatively large power consumption. Therefore, it is extremely difficult to increase the light intensity of the backlight.

Ina liquid crystal display device described in Japanese Patent Application Laid-open No. 2009-181092, the opening portion is formed in the lower electrode (common electrode), the opening portion overlapping boundary regions of the slits, which correspond to the connection portions of the slits and at which the inclined angle of the slit changes. In the region in which the opening portion is formed, an electric field, which rotates and drives the liquid crystal molecules, is not generated. With such a structure, the liquid crystal molecules in this region are held in the initial orientation state, and thus a black display region which does not transmit backlight is generated. Further, by causing the liquid crystal molecules in this region to be held in the initial orientation state, when the liquid crystal display device is pressed from an image display surface thereof, expansion or movement of a region which is incapable of normal image display is prevented. In the liquid crystal display device described in Japanese Patent Application Laid-open No. 2009-181092, black display is performed at the connection portions of the slits which overlap with the opening portion, and hence the connection portions do not contribute to image display. Therefore, there is a fear that the aperture ratio of the pixel decreases.

Further, in the technology described in Japanese Patent Application Laid-open No. 2008-276172, in one pixel region (sub-pixel region) surrounded by the drain lines and the gate lines, the inclined angles of the slits are all in the same direction, and the inclined angles of the slits are formed in different directions for respective adjacent pixel regions. Because of this structure, the one pixel (sub-pixel) has the viewing angle dependency, and there is a fear that the effect of reducing the viewing angle dependency by the multi-domain structure is lowered.

Meanwhile, the technology described in Japanese Patent Application Laid-open No. 2003-215636 has an object of suppressing breakage of the drain signal lines, and the technology described in Japanese Patent Application Laid-open No. 2007-199745 has an object of improving uniformity of the color tone of the display image. Yet, neither consideration nor description is made about disturbance of the image display due to the disturbance of the electric field generated at the curved portion of the pixel electrode.

SUMMARY OF THE INVENTION

The present invention has been made in view of the above-mentioned problems, and it is an object of the present invention to provide a multi-domain liquid crystal display device with a high aperture ratio of a pixel.

(1) In order to solve the above-mentioned problems, there is provided a liquid crystal display device, including a first substrate including: a plurality of gate lines arranged parallel to one another in a first direction; a plurality of drain lines arranged parallel to one another in a second direction while intersecting the plurality of gate lines; a first electrode in which a plurality of slits are formed; and a planar second electrode formed so as to be overlapped with the first electrode and on a lower layer side of the first electrode, in which: liquid crystal sandwiched between the first substrate and a second substrate is driven by an electric field generated between the first electrode and the second electrode; aperture regions surrounded by the plurality of drain lines and the plurality of gate lines include an aperture region including the slits having a first inclined angle and an aperture region including the slits having a second inclined angle, the second inclined angle being different from the first inclined angle; the aperture region including the slits having the first inclined angle and the aperture region including the slits having the second inclined angle are alternately formed in the first direction; and within the aperture regions arranged adjacent to each other in the first direction, a first region and a second region forming a pair by being arranged so as to be opposed to each other via one of the plurality of gate lines form one of pixels.

(2) In order to solve the above-mentioned problems, there is provided a liquid crystal display device, including a first substrate including: a plurality of gate lines arranged parallel to one another in a first direction; a plurality of drain lines arranged parallel to one another in a second direction while intersecting the plurality of gate lines; a first electrode in which a plurality of slits are formed; and a planar second electrode formed so as to be overlapped with the first electrode and on a lower layer side of the first electrode, in which: liquid crystal sandwiched between the first substrate and a second substrate is driven by an electric field generated between the first electrode and the second electrode; aperture regions surrounded by the plurality of drain lines and the plurality of gate lines include a first aperture region including the slits having a first inclined angle and a second aperture region including the slits having a second inclined angle, the second inclined angle being different from the first inclined angle; the first aperture region and the second aperture region are alternately formed in the first direction; each of the first aperture region and the second aperture region includes a first region and a second region, which are arranged parallel to each other in the first direction; at least one of the first electrode and the second electrode is separated at a boundary portion of the first region and the second region; and the first region of the first aperture region and the second region of the second aperture region form one of pixels, the first region and the second region forming a pair region.

According to the present invention, even in the multi-domain structure, the aperture ratio of the pixel can be increased.

Other effects of the present invention are made apparent from the description of the entire specification.

DETAILED DESCRIPTION OF THE INVENTION

Hereinafter, embodiments to which the present invention is applied are described with reference to the drawings. Note that, in the following description, the same components are denoted by the same reference symbols, and the overlapping description thereof is omitted.

First Embodiment

Overall Structure

Figure 1:
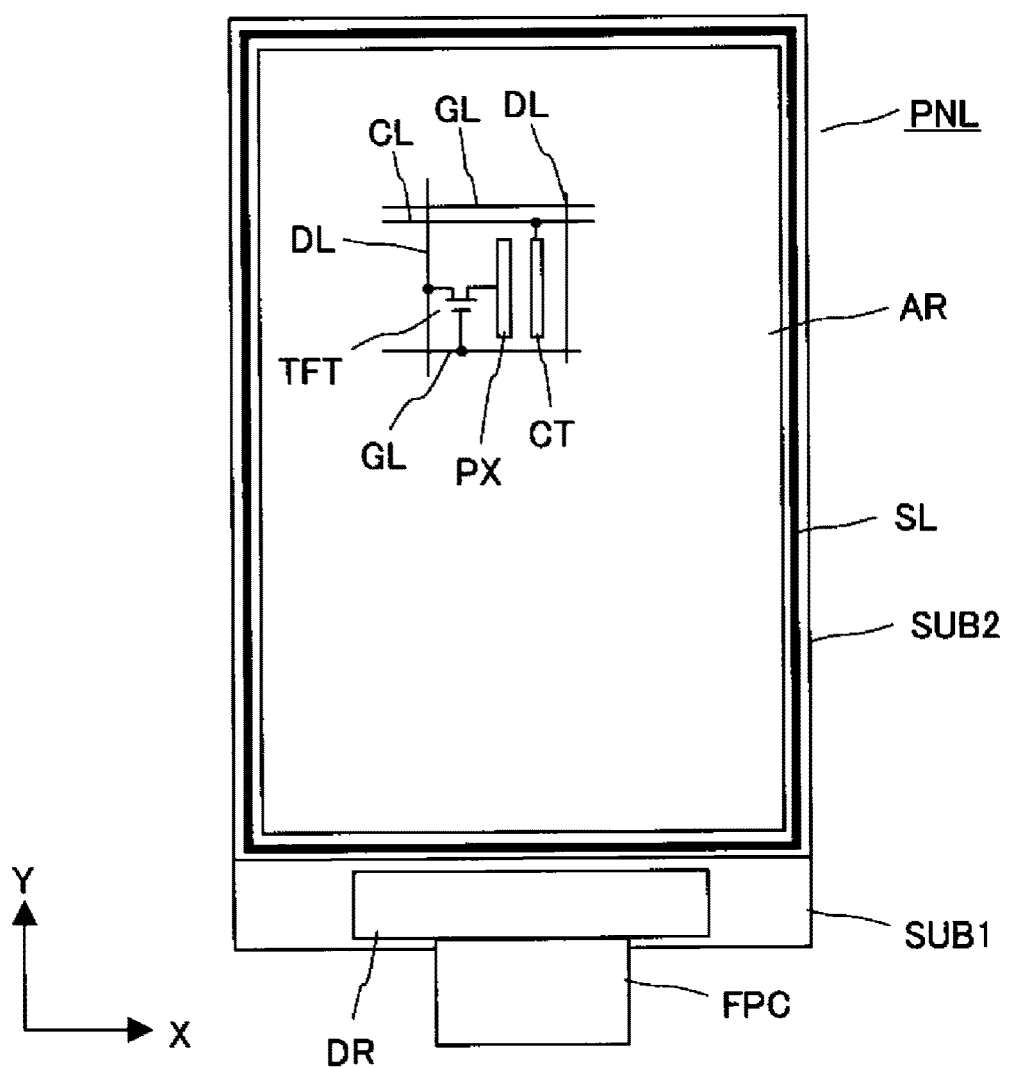
FIG. 1 is a view illustrating a schematic structure of a liquid crystal display device which is a display device according to a first embodiment of the present invention.

FIG. 1 is a view illustrating a schematic structure of a liquid crystal display device which is a display device according to a first embodiment of the present invention. Hereinafter, referring to FIG. 1, the overall structure of the liquid crystal display device of the first embodiment is described. Note that, reference symbols X and Y of FIG. 1 represents an X-axis and a Y-axis, respectively. Further, the following description is given assuming a case where the invention of the subject application is applied to an FFS liquid crystal display device in which an electric field having a component parallel to a main surface of a first substrate SUB1 is applied, in particular, a liquid crystal display device in which a pixel electrode is formed in the same layer as a drain line. However, the invention of the subject application is also applicable to other lateral electric field switching liquid crystal display devices, such as an IPS-Pro liquid crystal display device, in which the pixel electrode is laminated above the drain line through intermediation of an insulating film.

As illustrated in FIG. 1, the liquid crystal display device of the first embodiment includes a liquid crystal display panel PNL including: a first substrate SUB1, which has a pixel electrode (second electrode) PX, a thin film transistor TFT, and the like formed thereon; a second substrate SUB2, which has a color filter (not shown) and a black matrix (not shown) formed thereon and is provided so as to be opposed to the first substrate SUB1; and a liquid crystal layer (not shown) sandwiched between the first substrate SUB1 and the second substrate SUB2. The liquid crystal display panel PNL is combined with a backlight unit (backlight device) (not shown) as a light source for illuminating the liquid crystal display panel PNL, and thus the liquid crystal display device is formed. Fixing of the first substrate SUB1 and the second substrate SUB2 and sealing of liquid crystal are performed by using a sealing member SL, which is applied in a ring shape at a peripheral portion of the second substrate. Further, the second substrate SUB2 has an area smaller than that of the first substrate SUB1, and hence a side portion of the first substrate SUB1 on the lower side of FIG. 1 is exposed. Onto the side portion of the first substrate SUB1, drive circuit DR formed of a semiconductor chip is mounted. The drive circuit DR drives the respective pixels arranged on a display region AR. Note that, in the following description, even in the description of the liquid crystal display panel PNL, the liquid crystal display panel PNL is occasionally described as the "liquid crystal display device".

Further, as for the first substrate SUB1 and the second substrate SUB2, for example, a known glass substrate is generally used as a base. However, the substrate to be used is not limited to a glass substrate, and may be other insulating substrates such as a quartz glass and plastic (resin). For example, when a quartz glass is used, a process temperature may be increased, and hence a gate insulating film of the thin film transistor TFT may be densified. Thus, reliability may be improved. Besides, when a plastic (resin) substrate is used, it is possible to provide a lightweight liquid crystal display device having excellent impact resistance.

Further, in the liquid crystal display device of the first embodiment, a region in which display pixels (hereinafter, abbreviated as pixels) are formed within a region in which the liquid crystal is sealed corresponds to the display region AR. Therefore, even within the region in which the liquid crystal is sealed, a region in which pixels are not formed and which is not related to display does not correspond to the display region AR.

In the liquid crystal display device of the first embodiment, scanning signal lines (gate lines) GL are formed on a surface of the first substrate SUB1 on the liquid crystal side within the display region AR, the gate lines GL extending in the X-direction of FIG. 1 and being arranged parallel to one another in the Y-direction (first direction). The gate lines GL are supplied with a scanning signal from the drive circuit DR. Further, video signal lines (drain lines) DL extending in the Y-direction of FIG. 1 and being arranged parallel to one another in the X-direction (second direction) are formed. The drain lines DL are supplied with a video signal (gradation signal) from the drive circuit. A region surrounded by the drain lines DL and the gate lines GL forms a region which transmits backlight (hereinafter, referred to as aperture region). Further, in the liquid crystal display device of the first embodiment, the pixels are formed along the drain lines and the gate lines forming the aperture region, and the respective pixels are arranged in matrix within the display region AR. Each of the pixels includes, for example, the thin film transistor TFT which is ON/OFF driven by the scanning signal from the gate line GL, the pixel electrode PX which is supplied with the video signal from the drain line DL via the thin film transistor TFT in the ON state, and a common electrode (first electrode) CT which is formed at least on the entire surface of the display region, and is supplied with a common signal having a potential which becomes a reference with respect to a potential of the video signal, the common signal being supplied from one end or both ends on right and left sides in the X-direction (end portions of the first substrate SUB1) via a common line CL. Note that, the thin film transistor TFT is a so-called inverted staggered thin film transistor. Although the inverted staggered thin film transistor is driven in such a manner that a drain electrode and a source electrode switch places depending on the bias application thereto, in this specification, for the sake of convenience, an electrode connected to the drain line DL is represented as a drain electrode DT, and an electrode connected to the pixel electrode PX is represented as a source electrode ST.

An electric field having a component parallel to a main surface of the first substrate SUB1 is generated between the pixel electrode PX and the common electrode CT. The molecules of the liquid crystal are driven by this electric field. Such a liquid crystal display device is known as a liquid crystal display device capable of performing so-called wide viewing angle display. Because of the specificity of the electric field application to the liquid crystal, such type of the liquid crystal display device is called an in-plane switching (IPS) type or a lateral electric field type. Further, in the liquid crystal display device having such a structure, the display is performed in a normally black display mode, in which when an electric field is not applied to the liquid crystal, light transmittance is minimum (black display), and the light transmittance increases through application of the electric field.

Each of the drain lines DL and each of the gate lines GL are provided so that end portions thereof extend beyond the sealing member SL, and are connected to the drive circuit DR which generates drive signals such as the video signal and the scanning signal based on an input signal input from an external system via a flexible printed circuit board FPC. Note that, in the liquid crystal display device of the first embodiment, the drive circuit DR is formed of a semiconductor chip, and is mounted on the first substrate SUB1. Alternatively, any one or both of a video signal drive circuit for outputting the video signal and a scanning signal drive circuit for outputting the scanning signal may be mounted on a flexible printed circuit board FPC by a tape carrier method or a chip on film (COF) method, to thereby connect the any one or both of the drive circuits to the first substrate SUB1.

Note that, in the liquid crystal display device of the first embodiment, the common electrode CT is formed at least on the entire surface of the display region AR, but the present invention is not limited to this structure. For example, the common electrodes CT may be independently formed for respective pixels, and the common signals may be input to the common electrodes CT via the common line CL.

[Pixel Structure]

Figure 2:
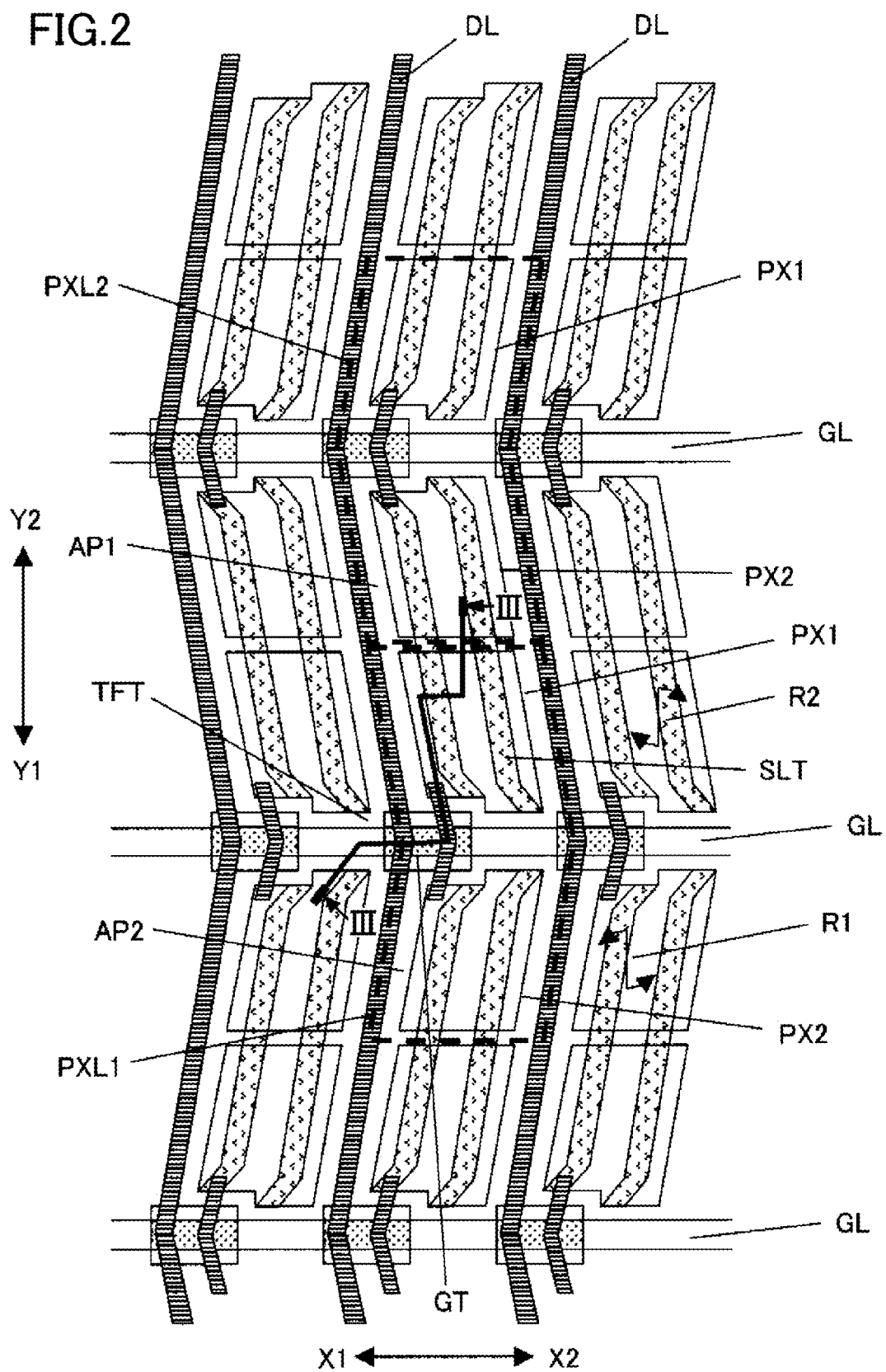
FIG. 2 is a plan view illustrating a pixel structure in the liquid crystal display device according to the first embodiment of the present invention.
Figure 3:
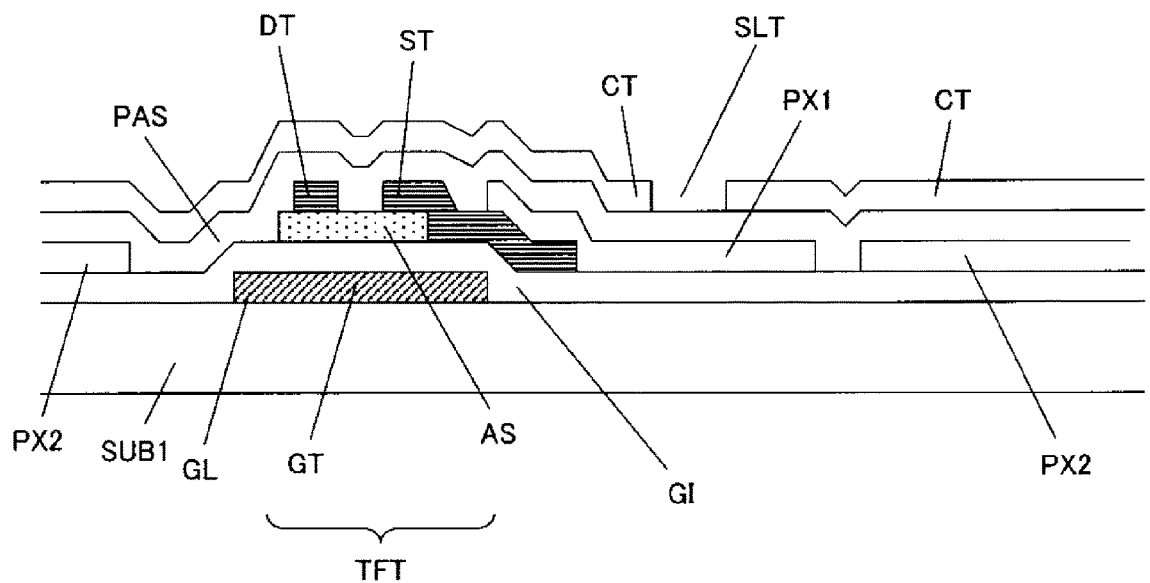
FIG. 3 is a cross-sectional view taken along the line III-III of FIG. 2.

FIG. 2 is a plan view illustrating a pixel structure in the liquid crystal display device according to the first embodiment of the present invention, and FIG. 3 is a cross-sectional view taken along the line of FIG. 2. Hereinafter, referring to FIGS. 2 and 3, the pixel structure of the liquid crystal display device according to the first embodiment is described. Note that, the liquid crystal display device according to the first embodiment is an IPS liquid crystal display device of a C-top type, in which the common electrode is arranged in an upper layer of the pixel electrode. Further, on the surface (surface on the liquid crystal side) of the first substrate SUB1, the gate lines GL, gate electrodes GT, and the common line (not shown) are formed. Further, reference symbols X1 and X2 in FIG. 2 represent arrows parallel to the X-axis, and reference symbols Y1 and Y2 in FIG. 2 represent arrows parallel to the Y-axis.

As illustrated in FIG. 2, the pixel of the liquid crystal display device of the first embodiment is configured so that, within each aperture region which is a region surrounded by the drain lines DL and the gate lines GL, two flat-plate like pixel electrodes PX1 and PX2 are formed. Further, as described in detail later, in an upper layer (liquid crystal side) of the pixel electrodes PX1 and PX2, the common electrode (not shown) made of a transparent conductive material such as indium-tin-oxide (ITO) is formed through intermediation of the insulating film. In the common electrode, slits SLT are formed, which correspond to a plurality of opening portions extending in the Y-direction indicated by the arrows Y1 and Y2 while being inclined in an X1-direction or an X2-direction at a predetermined angle with respect to the Y-direction. The linear common electrodes and the pixel electrodes PX1 and PX2 are overlapped with each other through intermediation of the insulating film.

In the direction in which the drain lines DL are arranged parallel to one another (extending direction of the gate lines GL), aperture regions AP1 and AP2, in which the slits SLT are inclined in the same direction, are arranged. In the Y-direction, which is the direction in which the gate lines GL are arranged parallel to one another, there are alternately arranged the aperture regions (second aperture regions) AP2 including the slits SLT inclined in the X1-direction and the aperture regions (first aperture regions) AP1 including the slits SLT inclined in the X2-direction.

Further, the thin film transistor TFT is formed on the gate line GL. The pixel electrodes PX1 and PX2 which are provided close to the gate line GL on which the thin film transistor TFT is formed are connected to the same thin film transistor TFT.

In the liquid crystal display device of the first embodiment having such a structure, as illustrated in FIG. 3, the gate electrode GT and the gate line GL are formed on the first substrate SUB1. In an upper layer of the gate line GL, the gate electrode GT, and the common line, an insulating film GI is formed on the entire surface of the first substrate SUB1 so as to cover the gate line GL, the gate electrode GT, and the common line. Note that, the insulating film GI functions as, in a semiconductor region, that is, in a region in which the thin film transistor TFT is formed, a gate insulating film of the thin film transistor TFT, and hence the film thickness thereof is set so as to correspond thereto.

On the upper surface of the insulating film GI at a position overlapping with the region of the gate electrode GT, a semiconductor layer AS made of, for example, amorphous silicon is formed. The semiconductor layer AS corresponds to a semiconductor layer of the thin film transistor TFT. Note that, the material of the semiconductor layer AS is not limited to amorphous silicon, and may be low-temperature polysilicon or microcrystalline silicon.

In an upper layer of the semiconductor layer AS, the drain line DL is formed. As described in detail later, the drain line DL extending in the Y-direction is curved in an overlapping region with the gate line GL, that is, in the upper layer of the semiconductor layer AS, so as to be parallel to the slits SLT.

Further, the source electrode ST, which is formed at the same time when the drain line DL and the drain electrode DT are formed, is opposed to the drain electrode DT on the semiconductor layer AS, and is extended to respective sides of the pixel electrodes PX1 and PX2 from the semiconductor layer AS. With this structure, the source electrode ST of the thin film transistor TFT forms one pixel (display pixel) PXL1, together with the pixel electrode PX1 on the Y1-side of the aperture region AP1 and the pixel electrode PX2 on the Y2-side of the aperture region AP2, the pixel electrode PX1 and the pixel electrode PX2 being adjacent to the gate line GL to be arranged close to the thin film transistor TFT.

Further, in an upper layer of the insulating film GI of the aperture region AP in a region in which the thin film transistor TFT is not formed, the flat-plate like pixel electrodes PX1 and PX2 each made of, for example, a transparent conductive material such as ITO are formed. The pixel electrodes PX1 and PX2 are formed in a step subsequent to the step of forming the drain electrode DT, the source electrode ST, and the like. A part of an end portion of the pixel electrode PX1 on the Y1-side (end portion on a side closer to the thin film transistor TFT), the pixel electrode PX1 being formed on the Y1-side within the aperture region AP1, is formed so as to overlap an upper surface of one end side (Y2-side) of the source electrode ST. In this manner, the source electrode ST and the pixel electrode PX1 are electrically connected to each other. Similarly, a part of an end portion of the pixel electrode PX2 on the Y2-side (end portion on a side closer to the thin film transistor TFT), the pixel electrode PX2 being formed on the Y2-side within the aperture region AP2, is formed so as to overlap an upper surface of another end side (Y1-side) of the source electrode ST. In this manner, the source electrode ST and the pixel electrode PX2 are electrically connected to each other.

In the upper layer of the drain electrode DT, the source electrode ST, the pixel electrodes PX1 and PX2, and the like, that is, on the surface of the first substrate SUB1, a known protective film PAS made of an insulating film is formed so as to cover the thin film transistor TFT. The protective film PAS is provided in order to avoid direct contact between the thin film transistor TFT and the liquid crystal (not shown). Further, the protective film PAS is formed on the entire surface of the first substrate SUB1 on the liquid crystal side, that is, so as to extend to reach a region up to a side edge portion. The common electrode CT is formed in an upper layer of the protective film PAS, and a region of the protective film PAS formed between the common electrode CT and the pixel electrodes PX1 and PX2 functions also as a dielectric film of the storage capacitor. In this case, the structure of the common electrode CT of the first embodiment is obtained by, after forming a transparent conductive material such as ITO in a plane shape within the display region AR, forming a plurality of slits SLT intersecting the X-direction at a portion corresponding to the aperture region AP, which is a region which transmits backlight. With those slits SLT, within the aperture region AP, linear (comb-shaped) electrodes overlapping the pixel electrodes PX1 and PX2 are formed. Further, in an upper layer of the common electrode CT, an orientation film (not shown) is formed.

Further, on the liquid crystal side of the second substrate SUB2, which is arranged so as to be opposed to the first substrate SUB1 through intermediation of the liquid crystal (not shown), known color filters of red (R), green (G), and blue (B), for forming pixels for color display are formed. In addition, at a boundary portion between the respective color filters, a black matrix as a light blocking film is formed. In an upper layer of the color filters and the black matrix, that is, on the surface on the liquid crystal side, an overcoat layer as a protective film is formed, and in an upper layer of the overcoat layer, that is, on the surface on the liquid crystal side, an orientation film (not shown) is formed.

[Detailed Structure of Pixel]

Figure 4:
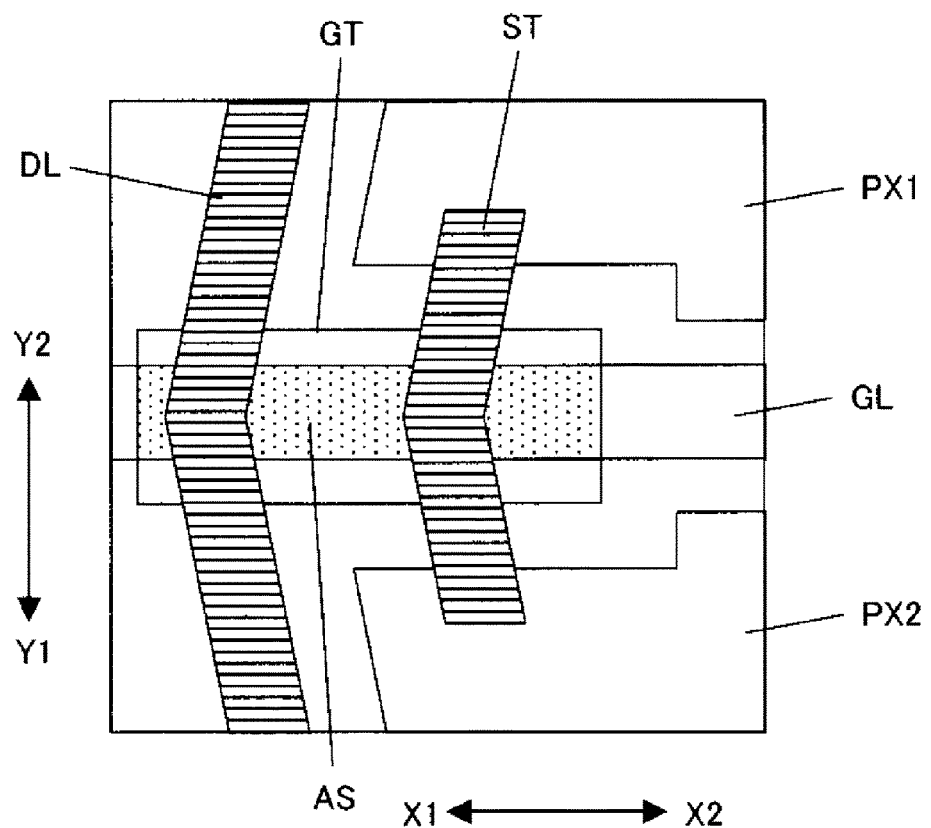
FIG. 4 is an enlarged view of a thin film transistor portion in the liquid crystal display device according to the first embodiment of the present invention.

FIG. 4 is an enlarged view of a thin film transistor portion in the liquid crystal display device according to the first embodiment of the present invention. Next, referring to FIGS. 2 and 4, the pixel structure of the first embodiment is described in detail.

As illustrated in FIG. 2, in the liquid crystal display device of the first embodiment, the aperture region AP surrounded by the drain lines DL and the gate lines GL is formed of two regions (first region and second region) which are separated in the Y-direction. The flat-plate like pixel electrode PX1 is formed in the first region on the Y1-side, and the flat-plate like pixel electrode PX2 is formed in the second region on the Y2-side. Further, the common electrode CT in the two regions separated in the Y-direction has the slits SLT formed therein. The slits SLT in the two regions within the same aperture region AP have inclined angles in the same direction, and are continuously formed even at a boundary of the two regions. As a result, in the Y-direction, which is the direction in which the gate lines GL are arranged parallel to one another, there are alternately arranged the aperture regions AP2 including the slits SLT inclined in the X1-direction and the aperture regions AP1 including the slits SLT inclined in the X2-direction.

In this case, as illustrated in FIG. 4, in the thin film transistor TFT of the first embodiment, a region of the gate line GL having a wiring width larger in the Y-direction than that of other parts becomes the gate electrode GT. In the upper layer of the gate electrode GT, the semiconductor layer AS made of amorphous silicon is formed with a width substantially the same as the gate line GL along the extending direction of the gate line GL. A part of the drain line DL overlaps the upper surface of the semiconductor layer AS so as to form the drain electrode DT. Further, on the upper surface of the semiconductor layer AS, the source electrode ST is formed so as to be opposed to the drain electrode DT with a predetermined distance. The source electrode ST is formed so as to straddle the semiconductor layer AS and the gate electrode GT (gate line GL), and the end portions of the source electrode ST are electrically connected to the pixel electrodes PX1 and PX2, respectively, which are provided close to the straddled gate line GL. With this structure, one pixel PXL1 or PXL2 is formed in a region in which, among the two pixel electrodes PX1 and PX2 formed within the respective aperture regions AP1 and AP2, the pixel electrodes PX1 and PX2 of the aperture regions AP1 and AP2, which are provided close to the gate line GL, are formed.

For example, in the pixel PXL1 on the lower middle side of FIG. 2, the pixel electrode PX2 formed on the upper side, that is, the Y2-side of the aperture region AP2 in the lower row of FIG. 2 and the pixel electrode PX1 formed on the lower side, that is, the Y1-side of the aperture region AP1 in the middle row of FIG. 2 are electrically connected to the source electrode ST of the same thin film transistor TFT. With this structure, one pixel PXL1 is formed of the second region on the upper side of the aperture region AP2 in FIG. 2 and the first region on the lower side of the aperture region AP1 in FIG. 2. Similarly, in the pixel PXL2, the pixel electrode PX2 formed on the upper side of the aperture region AP1 in FIG. 2 and the lower pixel electrode PX1 of the two pixel electrodes formed in the aperture region provided on the upper side of the aperture region AP1 in FIG. 2 are connected to the source electrode ST of the same thin film transistor TFT. With the two regions in which those pixel electrodes PX1 and PX2 are formed, one pixel PXL2 is formed.

As described above, in the liquid crystal display device of the first embodiment, for example, there are provided the region (first region) formed of the common electrode CT having the slits SLT inclined on the X1-side and the pixel electrode PX1 arranged so as to be opposed to the common electrode CT, and the region (second region) formed of the common electrode CT having the slits SLT inclined on the X2-side and the pixel electrode PX2 arranged so as to be opposed to the common electrode CT, and a pixel region formed of those two regions forms one pixel PXL1. Therefore, it is possible to realize the multi-domain structure capable of alleviating the viewing angle dependency.

In this case, the first region in which the pixel electrode PX1 is formed and the second region in which the pixel electrode PX2 is formed are configured so that the respective slits SLT thereof, which are formed in the common electrode CT arranged so as to be opposed to the respective pixel electrodes PX1 and PX2, have angles inclined in different directions. Therefore, for example, in the pixel PXL1 illustrated in FIG. 2, liquid crystal molecules in the first region are driven and rotated in a clockwise direction indicated by arrows R2 of FIG. 2, and liquid crystal molecules in the second region are driven and rotated in a counterclockwise direction indicated by arrows R1 of FIG. 2. As described above, the liquid crystal molecules in first region and the liquid crystal molecules in the second region are driven and rotated in opposite directions. Here, in the pixel structure of the first embodiment, the gate line GL is formed at the boundary portion of the first region and the second region having different rotational directions, and hence it is possible to increase an interval between the first region and the second region. As a result, it is possible to suppress the disturbance of the electric field at the boundary region of the first region and the second region, which is caused by interaction between the electric field generated in the first region and the electric field generated in the second region. Thus, it is possible to prevent disturbance of image display.

Meanwhile, in the first region and the second region which are adjacent within the same aperture region AP, the inclined angles of the slits SLT formed in the common electrode CT are in the same direction. Therefore, at the boundary portion of the pixels PXL adjacent in the Y-direction, the electric fields parallel to the main surface of the first substrate SUB1 are applied in the same direction, and hence the rotational directions of the liquid crystal molecules can be set to be in the same direction. In this manner, it is possible to prevent reduction in image quality, which is caused by the disturbance of the electric field at the boundary portion. As a result, in the liquid crystal display device of the first embodiment, it is possible to improve the aperture ratio of the pixel without reducing the display quality. In particular, in the liquid crystal display device according to the invention of the subject application, the region in which the gate line GL is formed, which does not conventionally correspond to a region which transmits backlight, matches the boundary portion of the slits SLT having different inclined directions corresponding to the respective pixels. Therefore, it is possible to obtain a special effect of improving the aperture ratio of the pixel without adding particular steps.

As described above, in the liquid crystal display device of the first embodiment, the slits in the common electrode are formed so that different inclined angles (opposite inclined angles) are alternately provided in the Y-direction for respective aperture regions surrounded by the drain lines and the gate lines, and the pixel electrode formed in each of the aperture regions is separated into at least two pixel electrodes which are arranged adjacent to each other. Among the separated pixel electrodes, the pixel electrodes adjacent to the gate line are supplied with a video signal from the same thin film transistor, and hence it is possible to match the boundary portion of the electrodes in which the inclined angles of the slits are different, that is, the inclined angles of the linear electrodes are different, for forming the multi-domain structure, with the region in which the gate line is formed, which is normally not used for display. As a result, the region with an abnormal electric field, which is generated at the boundary region with the linear electrodes having different inclined angles, can be formed to match with the region in which the gate line is formed, which is conventionally not used as a display region. Therefore, it is possible to improve the aperture ratio of the pixel in the multi-domain liquid crystal display device.

Note that, in the liquid crystal display device of the first embodiment, a pair of pixel electrodes PX1 and PX2 forming each of the pixels PXL1 and PXL2 are driven by the same thin film transistor TFT, but the present invention is not limited thereto. The pair of pixel electrodes PX1 and PX2 may be driven by separate thin film transistors TFT which are connected to the same drain line DL and gate line GL.

Further, in the liquid crystal display device of the first embodiment, the slits SLT are inclined in the X1-direction or the X2-direction with respect to the Y-direction at a predetermined inclined angle, but the slits SLT may be inclined in the Y1-direction or the Y2-direction with respect to the X-direction at a predetermined inclined angle.

Further, each of the slits SLT of the first embodiment has leading end portions in a longitudinal direction, which have inclined angles different from that of other portions. With this structure, the abnormal electric field to be generated at the end portions of the slit SLT is suppressed, to thereby reduce display defects. Note that, the end portion shape of the slit SLT is not limited thereto.

Still further, in the liquid crystal display device of the first embodiment, the pixel electrode is formed of a flat-plate like transparent electrode, and the linear common electrodes are formed in the upper layer of the pixel electrode so as to overlap the pixel electrode, but the present invention is not limited to this structure. For example, the common electrode may be formed of a flat-plate like transparent substrate, linear pixel electrodes may be formed in an upper layer of the common electrode, and the pixel electrode may be separated into the first region and the second region within each aperture region.

Second Embodiment

Figure 5:
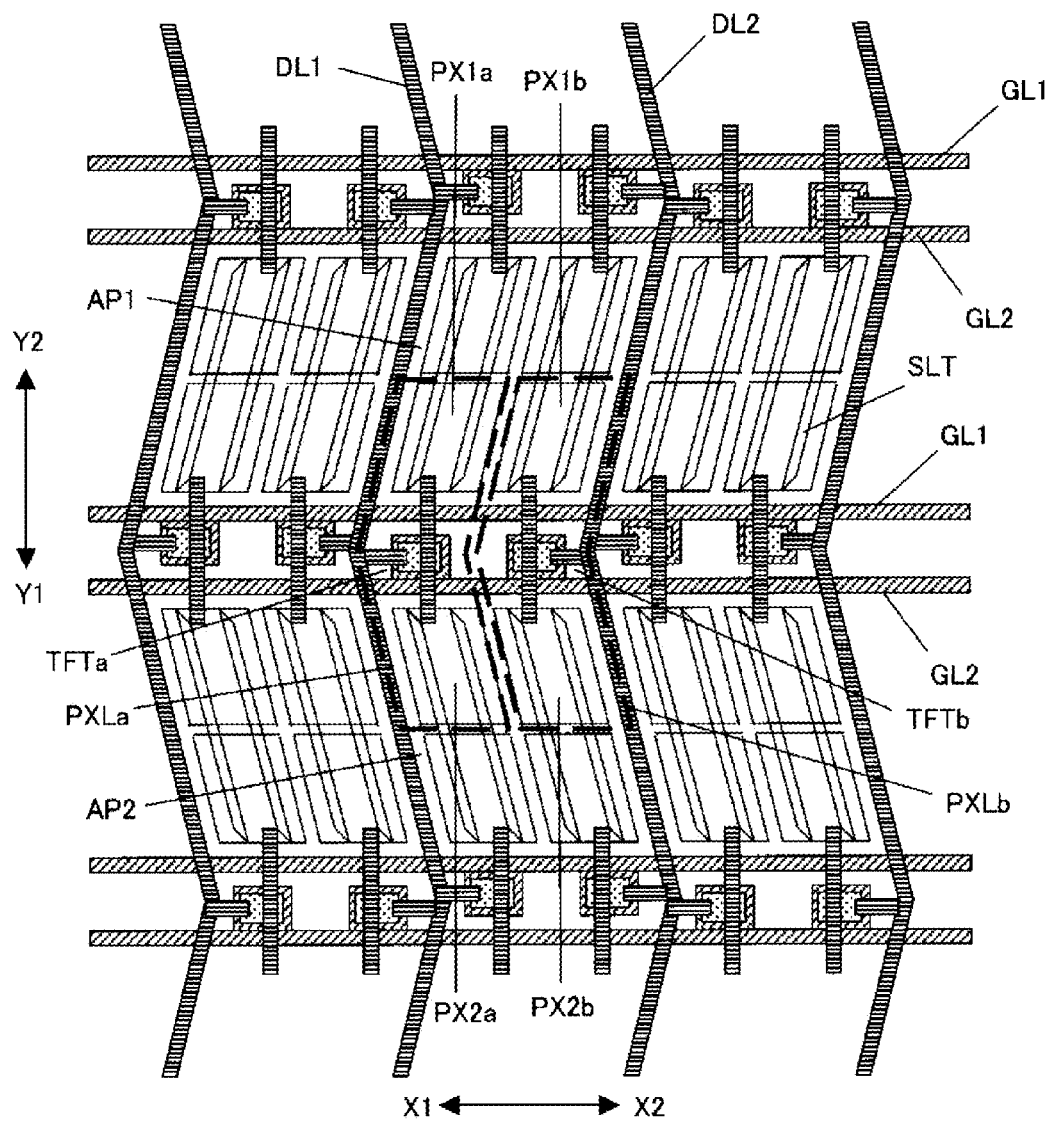
FIG. 5 is a view illustrating a pixel structure in a liquid crystal display device according to a second embodiment of the present invention.

FIG. 5 is a plan view illustrating a pixel structure in a liquid crystal display device according to a second embodiment of the present invention. Hereinafter, referring to FIG. 5, the liquid crystal display device according to the second embodiment is described. Note that, in the liquid crystal display device of the second embodiment, a region surrounded by drain lines DL1 and DL2 and gate lines GL1 and GL2 corresponds to the aperture region AP. Further, the liquid crystal display device of the second embodiment corresponds to an embodiment in which the invention of the subject application is applied to a liquid crystal display device of what is called a dual-gate type, in which two pixels adjacent in the X-direction are arranged between the adjacent drain lines DL.

As illustrated in FIG. 5, in the liquid crystal display device of the second embodiment, two gate lines GL1 and GL2 are formed between the aperture regions AP adjacent in the Y-direction. Further, thin film transistors TFTa and TFTb corresponding to the two pixel electrodes adjacent in the X-direction are formed between the two drain lines DL1 and DL2 adjacent in the X-direction. In this case, in the second embodiment, the video signal is supplied to the two thin film transistors TFT from one drain line DL. The two thin film transistors TFT are thin film transistors for different pixels PXL.

Further, one aperture region AP has four pixel electrodes PX in total formed therein, the one aperture region AP being halved in each of the Y-direction and the X-direction. In this case, similarly to the first embodiment, among the four pixel electrodes PX formed within the aperture region AP1, pixel electrodes PX1a and PX1b formed in the first region which is provided on a side close to one gate line GL1 of the pair of gate lines are electrically connected to the source electrodes of the thin film transistors TFTa and TFTb, respectively. Similarly, among the four pixel electrodes PX formed in the aperture region AP2, pixel electrodes PX2a and PX2b formed in the second region which is provided on a side close to one gate line GL2 of the pair of gate lines are electrically connected to the source electrodes of the thin film transistors TFTa and TFTb, respectively.

Further, in the upper layer of the pixel electrode PX, the common electrode (not shown) is formed through intermediation of the insulating film so as to overlap the pixel electrode PX, and the common electrode has the plurality of slits SLT formed therein for respective aperture regions AP. In this case, similarly to the first embodiment, each of the slits SLT is inclined in the X1-direction or the X2-direction with respect to the Y-direction at a predetermined inclined angle, and the slits SLT inclined in the X1-direction and the slits SLT inclined in the X2-direction are alternately arranged in the Y-direction for respective aperture regions AP, and further the slits SLT inclined in any one of the X1-direction and the X2-direction are arranged parallel to one another in the X-direction. Therefore, also in the liquid crystal display device of the second embodiment, the slits SLT in the first region and the slits SLT in the second region within the same aperture region AP have inclined angles in the same direction, and are continuously formed even at a boundary of the first region and the second region.

With this structure, one pixel PXLa is formed of, for example, the second region including the pixel electrode PX2a on the Y2-side of the aperture region AP2 and the common electrode, and the first region including the pixel electrode PX1a on the Y1-side of the aperture region AP1 and the common electrode. Similarly, one pixel PXLb is formed of, for example, the second region including the pixel electrode PX2b on the Y2-side of the aperture region AP2 and the common electrode, and the first region including the pixel electrode PX1b on the Y1-side of the aperture region AP1 and the common electrode. With this, in each of the pixels PXLa and PXLb, the first region in which the pixel electrode PX1a or PX1b is formed and the second region in which the pixel electrode PX2a or PX2b is formed have different inclined directions of the slits SLT formed in the common electrode arranged so as to be opposed to those pixel electrodes, and hence it is possible to realize the multi-domain structure.

Figure 6:
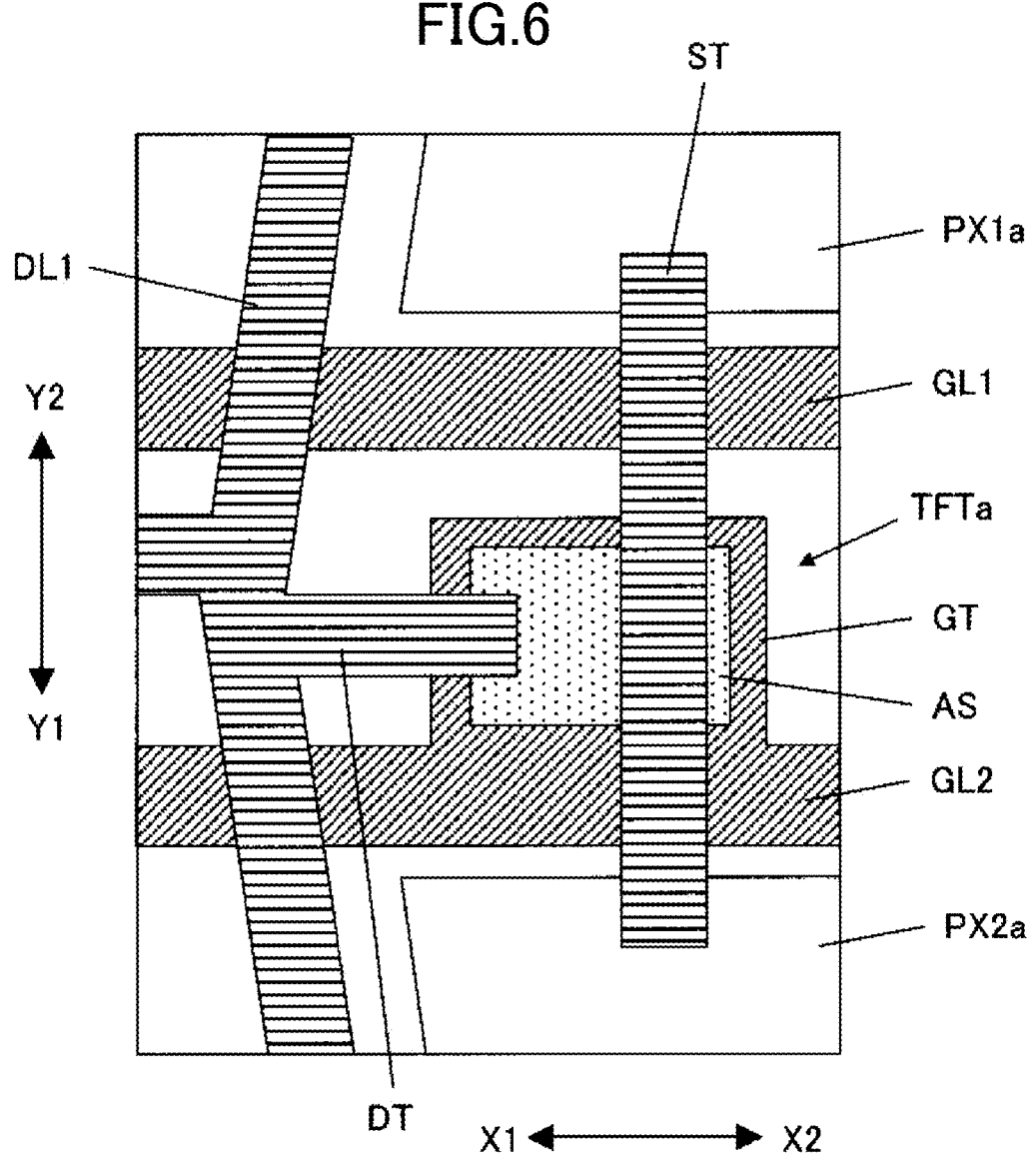
FIG. 6 is an enlarged view of a thin film transistor portion in the liquid crystal display device according to the second embodiment of the present invention.

Further, as illustrated in FIG. 6 corresponding to an enlarged view of the thin film transistor portion, in the second embodiment, the thin film transistor TFTa to which the pixel electrodes PX1a and PX2a are connected includes the gate electrode GT formed of a part of the gate line GL2 on the Y1-side, that is, on a lower side in FIG. 6 of the two gate lines GL1 and GL2 formed between the aperture regions AP adjacent in the Y-direction, the part of the gate line GL2 being protruded on the Y2-side, that is, an upper side in FIG. 6. In an upper layer of the gate electrode GT, the semiconductor layer AS is formed through intermediation of the insulating film (gate insulating film) (not shown), and in an upper layer of the semiconductor layer AS, the drain electrode DT formed of a part of the drain line DL1 extended in the X2-direction and the source electrode ST extended in the Y-direction are arranged so as to be opposed to each other with a distance therebetween.

One end (end portion in the Y2-direction) of the source electrode ST overlaps the pixel electrode PX1a so that the pixel electrode PX1a and the source electrode ST are electrically connected to each other. Further, another end (end portion in the Y1-direction) of the source electrode ST overlaps the pixel electrode PX2a so that the pixel electrode PX2a and the source electrode ST are electrically connected to each other. With this structure, the thin film transistor TFTa outputs, to the pixel electrode PX1a of the aperture region AP1 and the pixel electrode PX2a of the aperture region AP2, a video signal supplied to the drain line DL1 in synchronization with the gate signal from the gate line GL2. Note that, as is apparent from FIGS. 5 and 6, to the corresponding one drain line DL1, the thin film transistor TFT for the pixel PXL adjacent in the X1-direction is also connected. This adjacent thin film transistor TFT is driven by the gate electrode formed of a part of the gate line GL1 protruded in the Y1-direction as illustrated in FIG. 5.

Similarly, the thin film transistor TFTb to which the pixel electrodes PX1b and PX2b are connected includes the gate electrode GT formed of a part of the gate line GL2 protruded on the Y2-side (upper side in FIG. 6). In an upper layer of the gate electrode GT, the semiconductor layer AS is formed through intermediation of the insulating film (gate insulating film). In an upper layer of the semiconductor layer AS, the drain electrode DT formed of a part of the drain line DL2 extended in the X1-direction and the source electrode ST extended in the Y-direction are arranged so as to be opposed to each other with a distance therebetween. In this manner, the source electrode ST is electrically connected to each of the pixel electrode PX1b and the pixel electrode PX2b. With such a structure, the thin film transistor TFTb outputs, to the pixel electrode PX1b of the aperture region AP1 and the pixel electrode PX2b of the aperture region AP2, a video signal supplied to the drain line DL2 in synchronization with the gate signal from the gate line GL2.

Meanwhile, in each of the pixels adjacent to the pixels PXLa and PXLb in the X-direction and the Y-direction, the pixels PXLa and PXLb being illustrated in the center portion of FIG. 5, the gate electrode GT of the thin film transistor TFT connected to the pixel electrode of the each of the pixels is connected to the gate line GL1. Thus, in synchronization with the gate signal from the gate line GL1, the video signal supplied from the drain line is output to the pixel electrode. In this case, in the liquid crystal display device of the second embodiment, the gate signal (first gate signal) supplied to the gate line GL1 and the gate signal (second gate signal) supplied to the gate line GL2 are input at different timings, and in synchronization with the gate signals input at the different timings, the video signals corresponding to the pixels are supplied to the respective drain lines. With this, it is possible to reduce the number of the gate lines, which makes it possible to improve the aperture ratio.

As described above, in the liquid crystal display device of the second embodiment, in order to achieve the dual-gate liquid crystal display device, the aperture region is separated into two regions in the direction in which the drain lines are arranged parallel to one another (extending direction of the gate line), and further, each of the two regions of the aperture region is separated into two regions of the first region and the second region in the direction in which the gate lines are arranged parallel to one another, to thereby obtain four separated regions in total. In each of those four separated regions, a separated flat-plate like pixel electrode is formed, and each pixel electrode is overlapped with the common electrode formed in the upper layer thereof. In this case, the common electrode have the slits formed therein, which are inclined in different directions in the direction in which the gate lines are arranged parallel to one another.

Meanwhile, the pixel electrodes adjacent via the gate lines among the four separated pixel electrodes, that is, the pixel electrodes provided close to the gate lines among the pixel electrodes formed in the two aperture regions adjacent in the direction in which the gate lines are arranged parallel to one another are supplied with a video signal from one thin film transistor. Therefore, one pixel is formed of an electrode pair including the common electrode and the pixel electrodes, which are formed in a first region of a first aperture region and a second region of a second aperture region adjacent to the first aperture region, the first region and the second region being arranged so as to be opposed to each other via the gate lines. That is, similarly to the first embodiment, the aperture region AP is vertically separated into two regions (first region and second region). From one aperture region AP of the two aperture regions AP adjacent via the gate lines, the first region is selected, and from the other aperture region AP thereof, the second region is selected, to thereby form one pixel formed of the selected two regions. Therefore, it is possible to realize the multi-domain structure in which the slits, that is, the linear electrodes have different inclined directions, and further, the boundary portion of the slits having different inclined directions can be formed in the region in which the gate lines are formed, and hence it is possible to obtain effects similar to those obtained in the first embodiment.

Third Embodiment

Figure 7:
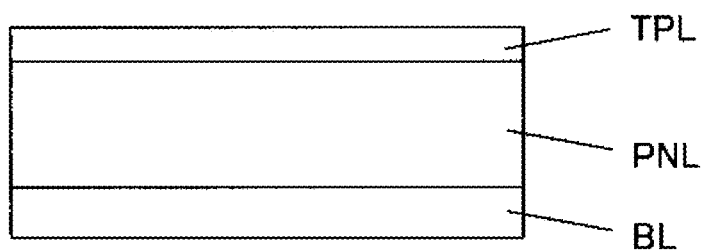
FIG. 7 is a cross-sectional view illustrating a schematic structure of a liquid crystal display device according to a third embodiment of the present invention.
Figure 8:
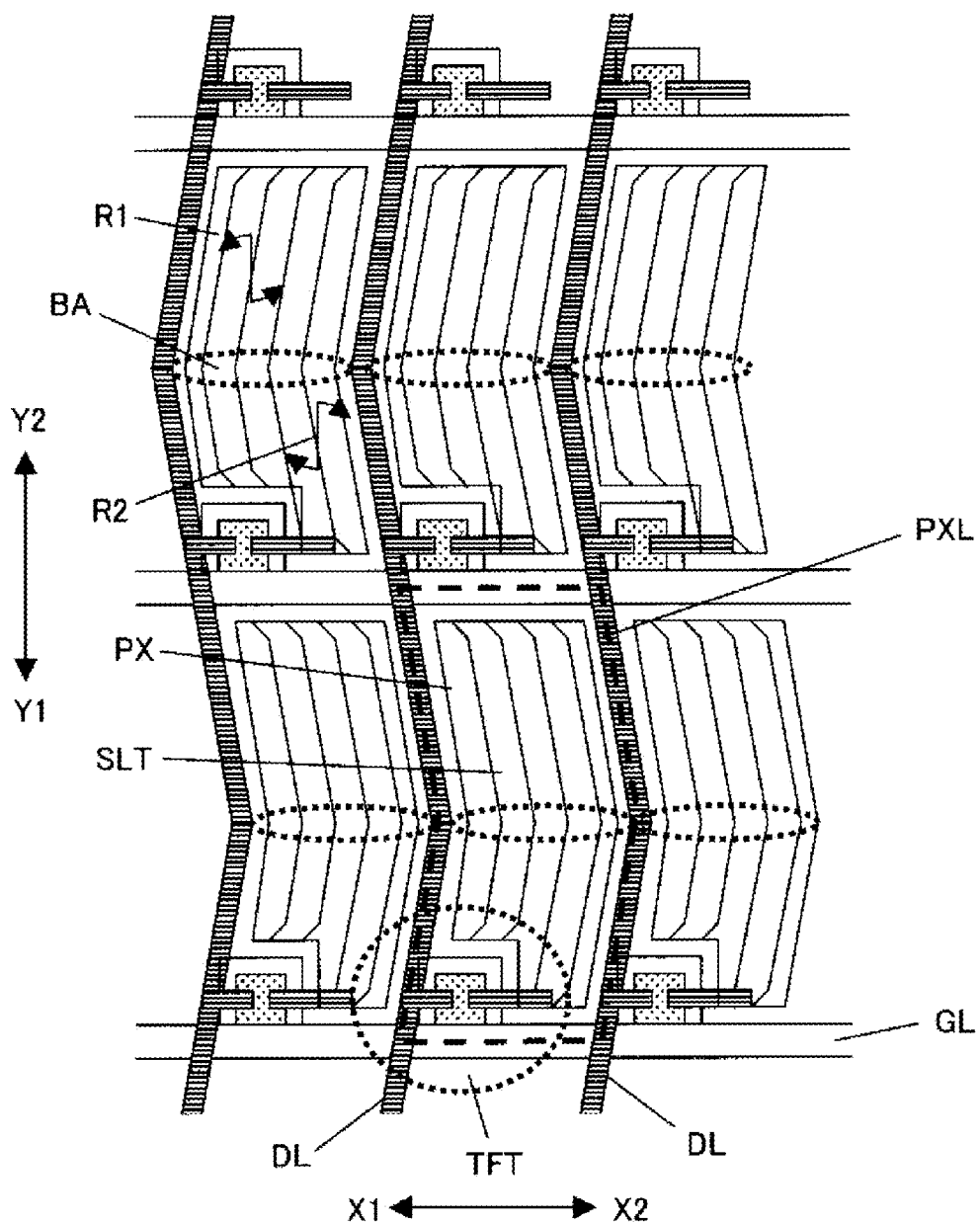
FIG. 8 is a view illustrating a pixel structure of a conventional liquid crystal display device.

FIG. 7 is a cross-sectional view illustrating a schematic structure of a liquid crystal display device according to a third embodiment of the present invention. The liquid crystal display device of the third embodiment illustrated in FIG. 7 has a structure in which a coordinate input device (touch panel) TPL is arranged on a front surface (display surface side) of the liquid crystal display panel PNL of the first embodiment. Note that, in the liquid crystal display device of the third embodiment, a case where the touch panel is mounted onto the liquid crystal display panel of the first embodiment is described, but the touch panel may be mounted onto a front surface of the liquid crystal display panel of the second embodiment.

As is apparent from FIG. 7, the liquid crystal display device of the third embodiment has a structure in which a known capacitive coordinate input device (touch panel) TPL is arranged on the front surface (display surface side) of the liquid crystal display panel PNL of the first embodiment. In the touch panel TPL of the third embodiment, for example, two insulating transparent substrates are adhered to each other with a predetermined distance therebetween. On an opposing surface side of one of the transparent substrates, transparent electrodes (not shown) for detection in the X-direction and the Y-direction are formed, and on an opposing surface side of the other of the transparent substrates, a transparent electrode is formed on the entire surface. With such a structure, the touch panel TPL of the third embodiment is capable of performing operations of both detection of a contact position to the touch panel TPL with the fingertip of an operator and detection of a contact position with a nonconductive member such as a stylus pen.

In the liquid crystal display device of the third embodiment, the touch panel TPL is arranged on the display surface side of the liquid crystal display panel PNL of the first embodiment, and hence a pressing force generated through contact to the surface of the touch panel TPL, that is, contact on the display surface side of the liquid crystal display device is also applied to the liquid crystal display panel PNL. In this case, because the liquid crystal display device of the third embodiment uses the liquid crystal display panel PNL of the first embodiment described above, even when the liquid crystal display panel PNL is pressed, a desired image can be displayed without deteriorating the quality of the display image.

Note that, the structure of the touch panel TPL is not limited to the structure in which the electrodes are respectively formed on the transparent substrate on the liquid crystal display panel PNL side and the transparent substrate on the contact side. For example, an electrode for capacitance detection may be formed only on the transparent substrate on the liquid crystal display panel PNL side. Further, even in the case where a known resistive touch panel is used, it is possible to obtain an effect that the coordinate input can be performed even when the touch panel is touched with a member other than human body, such as a stylus. Further, a coordinate input portion may be formed on the liquid crystal surface side of the first substrate forming the liquid crystal display panel PNL.

In the above, there has been concretely described the invention made by the inventor with reference to the embodiments of the invention. However, the present invention is not limited to the embodiments of the invention, and various modifications are possible within the scope not departing from the spirit of the invention.

What is claimed is:

1. A liquid crystal display device, comprising:
a plurality of gate lines, which are arranged parallel to one another in a first direction;
a plurality of drain lines, which are arranged parallel to one another in a second direction while intersecting the plurality of gate lines;
a plurality of first electrodes;
a second electrode, which is overlapped with the plurality of first electrodes and is formed on a lower layer side of the plurality of first electrodes;
a first substrate including the plurality of gate lines, the plurality of drain lines, the plurality of first electrodes, and the second electrode;
a second substrate; and
a liquid crystal, which is sandwiched between the first substrate and the second substrate;
wherein the liquid crystal is driven by an electric field generated between the plurality of first electrodes and the second electrode;
wherein the plurality of first electrodes include an electrode in which a first slit having a first inclined angle is formed and an electrode in which a second slit having a second inclined angle is formed, the second inclined angle being different from the first inclined angle;
wherein a plurality of aperture regions surrounded by the plurality of drain lines and the plurality of gate lines include a first aperture region including the first slit, and a second aperture region including the second slit;
wherein the first aperture region and the second aperture region are alternately formed in the first direction;
wherein the first aperture region and the second aperture region are arranged adjacent to each other in the first direction, each of the first aperture region and the second aperture region includes a first region and a second region, the first region of the first aperture region and the second region of the second aperture region form a pixel,
the first region of the first aperture region and the second region of the second aperture region are arranged so as to be opposed to each other via one of the plurality of gate lines;
wherein said first slit and said second slit are generally aligned to said plurality of drain lines;
wherein said first slit is located within both said first and second regions of said first aperture region;
wherein each pixel includes a thin film transistor for supplying, to one of the plurality of first electrodes and the second electrode, a video signal from one of the plurality of drain lines in synchronization with a gate signal from one of the plurality of gate lines;
wherein the thin film transistor supplies the same video signal to each of the first region and the second region forming the pixel; and
wherein said first electrodes in said first aperture region are connected to said first electrodes in said second aperture region by said thin film transistor.

2. The liquid crystal display device according to claim 1, wherein:
the thin film transistor is formed so as to overlap one of the plurality of gate lines; and
the thin film transistor has a source electrode which straddles the one of the plurality of gate lines so as to be electrically connected to each of the first region and the second region forming the pixel.

3. The liquid crystal display device according to claim 1, wherein a plurality of the pixels are arranged parallel to each other in the first direction so as to be adjacent within at least one of the plurality of aperture regions.

4. The liquid crystal display device according to claim 1, wherein said first aperture region contains at least two slits; and
wherein two pixels adjacent to each other in the first direction have the first slit in common.

5. The liquid crystal display device according to claim 1, wherein said at least two slits are generally parallel to each other.

6. The liquid crystal display device according to claim 1, wherein said thin film transistor uses a source line to connect said first electrodes in said first aperture region to said first electrodes in said second aperture region.

7. The liquid crystal display device according to claim 6, wherein said first region of said first aperture region and said second region of said second aperture region form a single pixel.

8. A liquid crystal display device, comprising:
a plurality of gate lines, which are arranged parallel to one another in a first direction;
a plurality of drain lines, which are arranged parallel to one another in a second direction while intersecting the plurality of gate lines;
a plurality of first electrodes;
a second electrode, which is overlapped with the plurality of first electrodes and is formed on a lower layer side of the plurality of first electrodes;
a first substrate including the plurality of gate lines, the plurality of drain lines, the plurality of first electrodes, and the second electrode;
a second substrate; and
a liquid crystal, which is sandwiched between the first substrate and the second substrate;
wherein the liquid crystal is driven by an electric field generated between the plurality of first electrodes and the second electrode;

wherein the plurality of first electrodes include an electrode in which a first slit having a first inclined angle is formed and an electrode in which a second slit having a second inclined angle is formed, the second inclined angle being different from the first inclined angle;

wherein a plurality of aperture regions surrounded by the plurality of drain lines and the plurality of gate lines include a first aperture region including the first slit, and a second aperture region including the second slit;

wherein the first aperture region and the second aperture region are alternately formed in the first direction;

wherein each of the first aperture region and the second aperture region includes a first region and a second region, wherein said first region and second region of said first aperture region are parallel to each other in said first direction, and said first region and second region of said second aperture region are parallel to each other in said first direction;

wherein at least one of the plurality of first electrodes and the second electrode is separated at a boundary portion of the first region of said first aperture region and the second region of said second aperture region;

wherein the first region of the first aperture region and the second region of the second aperture region form a pixel, the first region of said first aperture region and the second region of said second aperture region arranged so as to be opposed to each other via one of the plurality of gate lines;

wherein said first slit and said second slit are generally aligned to said plurality of drain lines;

wherein said first slit is located within both said first and second regions of said first aperture region;

wherein for each pixel, a thin film transistor for supplying, to one of the plurality of first electrodes and the second electrode, a video signal from one of the plurality of drain lines in synchronization with a gate signal from one of the plurality of gate lines;

wherein the thin film transistor supplies the same video signal to each of the first region and the second region forming the pixel; and wherein said first electrodes in said first aperture region are connected to said first electrodes in said second aperture region by said thin film transistor.

9. The liquid crystal display device according to claim 8, wherein:

the thin film transistor is formed so as to overlap one of the plurality of gate lines; and the thin film transistor has a source electrode which straddles the one of the plurality of gate lines so as to be electrically connected to each of the first region and the second region forming the pixel.

10. The liquid crystal display device according to claim 8, wherein a plurality of the pixels are arranged parallel to each other in the first direction so as to be adjacent within at least one of the plurality of aperture regions.

11. A liquid crystal display device, comprising:

a plurality of gate lines arranged parallel to one another in a first direction;

a plurality of drain lines arranged parallel to one another in a second direction while intersecting the plurality of gate lines;

a plurality of electrodes of a first type, including a first electrode of the first type, in which a first slit having a first inclined angle is formed, and a second electrode of the first type, in which a second slit having a second inclined angle is formed, the second inclined angle being different from the first inclined angle, and said first and second slits being generally aligned to said plurality of drain lines;

an electrode of a second type, overlapped with the plurality of electrodes of the first type, and formed on a lower layer side of the plurality of electrodes of the first type;

a first substrate including the plurality of gate lines, the plurality of drain lines, the plurality of electrodes of the first type, and the electrode of the second type;

a second substrate;

a liquid crystal sandwiched between the first substrate and the second substrate, wherein the liquid crystal is driven by an electric field generated between the plurality of electrodes of the first type and the electrode of the second type; and a first aperture region including the first slit, and a second aperture region including the second slit, the first and second aperture regions being surrounded by the plurality of drain lines and the plurality of gate lines, and being alternately formed in the first direction;

wherein the first and second aperture regions are arranged adjacent to each other in the first direction, and each of the first and second aperture regions including a first region and a second region, such that the first region of the first aperture region and the second region of the second aperture region form a pixel and are arranged so as to be opposed to each other via one of the plurality of gate lines;

wherein said first slit is located within both said first and second regions of said first aperture region;

wherein each pixel includes a thin film transistor for supplying, to one of the plurality of first electrodes and the second electrode, a video signal from one of the plurality of drain lines in synchronization with a gate signal from one of the plurality of gate lines;

wherein the thin film transistor supplies the same video signal to each of the first region and the second region forming the pixel; and wherein said first electrodes in said first aperture region are connected to said first electrodes in said second aperture region by said thin film transistor.

* * * * *

UNITED STATES PATENT AND TRADEMARK OFFICE
CERTIFICATE OF CORRECTION

PATENT NO. : 8,817,211 B2
APPLICATION NO. : 13/217312
DATED : August 26, 2014
INVENTOR(S) : Takeshi Sato It is certified that error appears in the above-identified patent and that said Letters Patent is hereby corrected as shown below:

Title page, item (73) should read as follows:

(73) Assignee: Japan Display Inc., Tokyo (JP)
Panasonic Liquid Crystal Display Co., Ltd., Hyogo-ken (JP)

Signed and Sealed this
Seventeenth Day of March, 2015

Michelle K. Lee
*Director of the United States Patent and Trademark Office*